(12) United States Patent
Honjo

(10) Patent No.: US 7,236,688 B2
(45) Date of Patent: Jun. 26, 2007

(54) SIGNAL PROCESSING METHOD AND SIGNAL PROCESSING APPARATUS

(75) Inventor: Masahiro Honjo, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1524 days.

(21) Appl. No.: 09/912,540

(22) Filed: Jul. 26, 2001

(65) Prior Publication Data

US 2002/0015448 A1  Feb. 7, 2002

(30) Foreign Application Priority Data

Jul. 26, 2000 (JP) .............................. 2000-225018

(51) Int. Cl.
*H04N 7/26* (2006.01)
*H04N 7/00* (2006.01)
(52) U.S. Cl. ...................................... 386/109; 386/104
(58) Field of Classification Search ................. 386/52, 386/109, 111, 112, 124; 360/106, 15
See application file for complete search history.

(56) References Cited

U.S. PATENT DOCUMENTS 6,516,135 B1 * 2/2003 Higuchi et al. ............. 386/112

FOREIGN PATENT DOCUMENTS

JP  9-121368  5/1997

* cited by examiner

*Primary Examiner*—Robert Chevalier
(74) *Attorney, Agent, or Firm*—Wenderoth, Lind & Ponack, L.L.P.

(57) ABSTRACT

The present invention enables part of coded video data and coded audio data which are recorded as an MPEG stream to be dubbed, with changing the coding method into an optimum coding method. A signal processing apparatus of this invention includes a reading part for reading an MPEG stream recorded on an optical disk; a video decoding part for decoding MPEG2-coded video data included in the read MPEG stream; and an audio decoding part for decoding AAC-coded audio data included in the read MPEG stream. This signal processing apparatus re-codes decoded video data corresponding to the image of a frame which is designated by user's operation, and decoded audio data corresponding to the video data, by JPEG method and MP3 method, respectively, and records re-coded data on a memory card.

15 Claims, 7 Drawing Sheets

SIGNAL PROCESSING METHOD AND SIGNAL PROCESSING APPARATUS

FIELD OF THE INVENTION

The present invention relates to a signal processing method and a signal processing apparatus and, more particularly, to a process of dubbing digital video data or digital audio data.

BACKGROUND OF THE INVENTION

Conventionally, dubbing of an MPEG (Moving Picture Experts Group) stream in which digital data such as motion video and audio are multiplexed (multiplexed coded data) is carried out while maintaining the form of the MPEG stream.

The reason is as follows. For example, when video data is coded by MPEG2 method while audio data is coded by MPEG1 method, the coded video data and the coded audio data are multiplexed as an MPEG stream for synchronization between these data. That is, the dubbing can be carried out at the highest efficiency when the coded video data and the coded audio data included in the MPEG stream are dubbed collectively as the MPEG stream. Another reason why the dubbing of the MPEG stream is conventionally carried out while maintaining the stream form is that there has been proposed no dubbing method other than such dubbing method.

FIG. 6 is a diagram for explaining the above-mentioned MPEG stream.

With reference to FIG. 6, video data coded by MPEG2 method (coded video data) Dvc and audio data coded by AC3 method (coded audio data) Dac are multiplexed as an MPEG stream Ds. Here, AC3 method is an audio coding method which is recommended in DVD (Digital Versatile Disk) video standards. Specifically, the MPEG stream Ds includes compressed video data Dvtc which is obtained by subjecting the coded video data Dvc to time-axis compression so that the data Dvc can be multiplexed with the coded audio data Dac, and compressed audio data Datc which is obtained by subjecting the coded audio data Dac to time-axis compression so that the data Dac can be multiplexed with the coded video data Dvc.

That is, the coded video data Dvc has such a data structure that it is divided in predetermined data units (GOP). For example, as shown in FIG. 6, the coded video data Dvc includes coded video data Dvc1 corresponding to 1st to 16th video frames F1 to F16 constituting a first GOP (Group of Pictures), and coded video data Dvc2 corresponding to 17th to 32nd video frames F17 to F32 constituting a second GOP. Further, as shown in FIG. 6, the compressed video data Dvtc includes time-axis-compressed data V1 to V3 corresponding to the first GOP, and time-axis-compressed data V4 to V6 corresponding to the second GOP.

The time-axis-compressed data V1 is obtained by performing time-axis compression on the forward part of the coded video data Dvc1 corresponding to the first GOP collectively, the time-axis-compressed data V2 is obtained by performing time-axis compression on the middle part of the coded video data Dvc1 collectively, and the time-axis-compressed data V3 is obtained by performing time-axis compression on the rearward part of the coded video data Dvc1 collectively. Further, the time-axis-compressed data V4 is obtained by performing time-axis compression on the forward part of the coded video data Dvc2 corresponding to the second GOP collectively, the time-axis-compressed data V5 is obtained by performing time-axis compression on the middle part of the coded video data Dvc2 collectively, and the time-axis-compressed data V6 is obtained by performing time-axis compression on the rearward part of the coded video data Dvc2 collectively.

Here, I data (intra-frame coded data) in the coded video data Dvc1 corresponding to the first GOP corresponds to frame F1, and P and B data (inter-frame coded data) corresponding to frames F2 to F16 are arranged subsequent to the I data corresponding to the frame F1. I data (intra-frame coded data) in the coded video data Dvc2 corresponding to the second GOP corresponds to frame F17, and P and B data (inter-frame coded data) corresponding to frames F18 to F32 are arranged subsequent to the I data corresponding to the frame F17.

Further, as shown in FIG. 6, the compressed audio data Datc includes time-axis-compressed data A1 to A3 corresponding to the first GOP, and time-axis-compressed data A4 to A6 corresponding to the second GOP.

The time-axis-compressed data A1, A2 and A3 are obtained by performing time-axis compression on parts of the coded audio data Dac, approximately corresponding to the time-axis-compressed data V1, V2 and V3 in the compressed video data Dvtc, respectively. Further, the time-axis-compressed data A4, A5 and A6 are obtained by performing time-axis compression on parts of the coded audio data Dac, approximately corresponding to the time-axis-compressed data V4, V5 and V6 in the compressed video data Dvtc, respectively.

FIG. 7 is a block diagram for explaining a dubbing process using a conventional signal processing apparatus, and illustrates a DVD player and a DVD recorder as a conventional signal processing apparatus.

Initially, a description will be given of a DVD player 201 as a conventional signal processing apparatus.

The DVD player 201 includes a driving means 10 for driving an optical disk 1 as a first recording medium on the basis of a control signal Cd1, and a reading means 2 for reading data Ds from the optical disk 1 on the basis of a control signal Cro. On the optical disk 1, coded video data and coded audio data, which are multiplexed, are recorded as an MPEG stream Ds. As the MPEG stream, there are a transport stream (TS) and a program stream (PS), and in either stream, coded video data and coded audio data are time-axis-compressed and then multiplexed so that the both data can be played back in synchronization with each other.

The DVD player 201 further includes a video decoding means 3 and an audio decoding means 5. The video decoding means 3 receives the MPEG stream Ds read from the optical disk 1, and decodes the coded video data which has been obtained by MPEG2 method and is included in the MPEG stream Ds to output a baseband (non-compressed) video signal Dvd. The audio decoding means 5 receives the MPEG stream Ds read from the optical disk 1, and decodes the coded audio data which has been obtained by AC3 method and is included in the MPEG stream Ds to output a baseband (non-compressed) PCM (Pulse-Code Modulation) audio signal Dad.

The DVD player 201 further includes a D/A converter 11 for D/A-converting the baseband video signal Dvd outputted from the video decoding means 3 to output an analog video signal Sv; a TV monitor 12 for performing image display on the basis of the analog video signal Sv; a D/A converter 13 for D/A-converting the baseband audio signal Dad outputted from the audio decoding means 5 to output an analog audio signal Sa; and a speaker 14 for outputting an audio output on the basis of the analog audio signal Sa.

The DVD player 201 further includes a user's operation unit 15; a control means 9 for outputting the control signals Cd1 and Cro to the driving means 10 and the reading means 2, respectively, as well as control signals (not shown) to the other means 3 and 5 and the D/A converters 11 and 13 on the basis of an operation signal Sop1 generated in the operation unit 15; and output terminals 201a and 201b for outputting the analog video signal Sv and the analog audio signal Sa to the outside of the player, respectively.

Next, a description will be given of a DVD recorder 202 as the conventional signal processing apparatus.

The DVD recorder 202 includes input terminals 202a and 202b for receiving the analog video signal Sv and the analog audio signal Sa, respectively; an A/D converter 21 for converting the analog video signal Sv into a baseband digital video signal Dv; and an A/D converter 22 for converting the analog audio signal Sa into a baseband digital audio signal Da.

The DVD recorder 202 further includes a video coding means 23 for coding the baseband video signal Dv Lo output coded video data Dvc; and an audio coding means 24 for coding the baseband audio signal Da to output coded audio data Dac.

The DVD recorder 202 further includes a driving means 27 for driving an optical disk 26 as a second recording medium on the basis of a control signal Cd2; and a recording means 25 for multiplexing the coded video data Dvc and the coded audio data Dac on the basis of a control signal Cre, and recording the multiplexed data as an MPEG stream Dw on the optical disk 26.

The DVD recorder 202 further includes a user's operation unit 29; and a control means 28 for outputting the control signals Crc and Cd2 to the driving means 27 and the recording means 25, respectively, as well as control signals (not shown) to the other means 23 and 24 and the A/D converters 21 and 22 on the basis of an operation signal Sop2 generated in the operation unit 29.

Next, a description will be given of the operation of the conventional signal processing apparatus Initially, the operation of the DVD player 201 will be described.

In the DVD player 201, when a process of playing back the data recorded on the optical disk 1 as the first recording medium is selected by user's operation, the respective means of the DVD player 201 perform the data playback process on the basis of the control signals from the control means 9.

To be specific, initially, the optical disk 1 is driven by the driving means 10 that is controlled by the control signal Cd1, and the data Ds is read from the optical disk 1 by the reading means 2. The read data Ds is supplied from the reading means 2 to the video decoding means 3 and to the audio decoding means 5.

More specifically, the video decoding means 3 and the audio decoding means 5 are supplied with, as the data Ds, an MPEG stream including MPEG2-coded video data and AC3-coded audio data.

Then, the video decoding means 3 performs a video decoding process for extracting the MPEG2-coded video data from the MPEG stream Ds and decoding the data, whereby a baseband video signal Dvd is generated. This video signal Dvd is outputted to the D/A converter 11.

The D/A converter 11 performs a D/A conversion process for converting the video signal Dvd into an analog video signal Sv, and the analog video signal Sv is outputted to the TV monitor 12. The TV monitor 12 performs image display on the basis of the analog video signal Sv.

Further, simultaneously with the above-mentioned playback of the coded video data, the audio decoding means 5 performs an audio decoding process for extracting the AC3-coded audio data from the MPEG stream Ds and decoding the data, whereby a baseband PCM audio signal Dad is generated. This audio signal Dad is outputted to the D/A converter 13.

The D/A converter 13 performs a D/A conversion process for converting the audio signal Dad into an analog audio signal Sa, and the analog audio signal Sa is outputted to the speaker 14. The speaker 14 performs audio playback on the basis of the analog audio signal Sa.

Further, during the above-mentioned playback of the coded video data and the coded audio data, the analog video signal Sv and the analog audio signal Sa are outputted to the output terminals 201a and 201b of the DVD player 201, respectively.

Next, a description will be given of a dubbing process for recording the data recorded on the optical disk 1 as the first recording means, on the optical disk 26 as the second recording medium, by using the DVD player 201 and the DVD recorder 202.

In advance of performing the dubbing process, the output terminals 201a and 201b of the DVD player 201 are connected to the corresponding input terminals 202a and 202b of the DVD recorder 202, respectively.

In the DVD player 201, when an operation signal Sop1 is supplied from the user operation unit 15 to the control means 9, the control means 9 outputs control signals for controlling the respective parts. Further, in the DVD recorder 202, when an operation signal Sop2 is supplied from the user operation unit 29 to the control means 28, the control means 28 outputs control signals for controlling the respective parts.

Then, in the DVD player 201, the playback of the MPEG stream recorded on the optical disk 1 is carried out as described above, and the analog video signal Sv and the analog audio signal Sa obtained by the playback of the MPEG stream are outputted. On the other hand, in the DVD recorder 202, a recording process of subjecting the analog video signal Sv and the analog audio signal Sa outputted from the DVD player 201 to A/D conversion, coding and multiplexing, and recording data generated by the multiplexing is carried out.

To be specific, in the DVD player 201, the MPEG stream recorded on the optical disk 1 is played back, and thus the analog video signal Sv and the analog audio signal Sa obtained by the playback of the MPEG stream are outputted from the output terminals 201a and 201b of the DVD player 201 to the input terminals 202a and 202b of the DVD recorder 202, respectively.

In the DVD recorder 202, the analog video signal Sv inputted to the input terminal 202a is converted to a digital video signal Dv by the A/D converter 21, and supplied to the video coding means 23. On the other hand, the analog audio signal Sa inputted to the input terminal 202b is converted to a digital audio signal Da by the A/D converter 22, and supplied to the audio coding means 24.

In the video coding means 23, coded video data Dvc is generated by coding the digital video signal Dv, and in the audio coding means 24, coded audio data Dac is generated by coding the digital audio signal Da, and then the coded video data Dvc and the coded audio data Dac are supplied to the recording means 25.

The coded video data Dvc and the coded audio data Dac are multiplexed and recorded on the optical disk 26 by the recording means 25.

In this way, the dubbing process, i.e., recording of the MPEG stream recorded on the optical disk 1 as the first recording medium, on the optical disk 26 as the second recording medium, is carried out.

By the way, in recent years, portable recording mediums such as semiconductor memories or the like are becoming widespread, and there may be cases where digital data such as motion video and audio are dubbed on such portable recording mediums.

In a dubbing process to the portable recording mediums such as semiconductor memories or the like, it is sometimes required that not the whole of the video data and audio data multiplexed as the MPEG stream but a part of the video data and audio data or only one of the video data or the audio data is selectively recorded.

In this case, however, by the conventional technique of dubbing the MPEG stream while maintaining the stream form, it is difficult to appropriately record only a part of the video data and audio data multiplexed as the MPEG stream or either the video data or the audio data.

SUMMARY OF THE INVENTION

The present invention is made to solve the above-described problems and has for its object to provide a signal processing method and a signal processing apparatus by which a desired part of audio data and video data which are multiplexed and recorded as an MPEG stream can be selected to be dubbed in accordance with a user's designation.

According to a 1st aspect of the present invention, there is provided a signal processing method for reading data from a first recording medium on which multiplexed data obtained by multiplexing coded audio data and coded video data are recorded, and recording the data on a second recording medium, comprising: a reading step of reading the multiplexed data from the first recording medium; a decoding step of decoding at least one of the coded audio data and the coded video data which are included in the readout multiplexed data, to generate decoded data; a re-coding step of re-coding the decoded data by a coding method which is different from a first coding method used in a coding process of the coded audio data and a second coding method used in a coding process of the coded video data, to generate re-coded data; and a recording step of recording the re-coded data on the second recording medium. Therefore, a desired portion of audio data and video data which are multiplexed and recorded as an MPEG stream can be selected and dubbed in accordance with the user's designation.

According to a 2nd aspect of the present invention, in the signal processing method of the 1st aspect, the decoding step is a step of decoding at least part of the coded audio data included in the readout multiplexed data, to generate decoded audio data; and the re-coding step is a step of re-coding the decoded audio data by a third coding method which is different from the first coding method, to generate re-coded audio data as the re-coded data. Therefore, coded audio data included in an MPEG stream or the like which is recorded on the first recording medium can be digitally dubbed, with changing its coding method into the optimum coding method for the second recording medium.

According to a 3rd aspect of the present invention, in the signal processing method of the 1st aspect, the decoding step is a step of decoding at least part of the coded video data included in the readout multiplexed data, to generate decoded video data; and the re-coding step is a step of re-coding the decoded video data by a fourth coding method which is different from the second coding method, to generate re-coded video data as the re-coded data. Therefore, coded video data included in an MPEG stream or the like which is recorded on the first recording medium can be digitally dubbed, with changing its coding method into the optimum coding method for the second recording medium.

According to a 4th aspect of the present invention, in the signal processing method of the 1st aspect, the decoding step is a step of decoding at least part of the coded video data included in the readout multiplexed data, to generate decoded video data; the re-coding step is a step of re-coding the decoded video data by a fourth coding method which is different from the second coding method, to generate re-coded video data; and the recording step is a step of recording at least part of the coded audio data included in the readout multiplexed data and the re-coded video data on the second recording medium. Therefore, coded video data and coded audio data included in an MPEG stream or the like which is recorded on the first recording medium can be digitally dubbed, with changing only the coding method of the coded video data into the optimum coding method for the second recording medium.

According to a 5th aspect of the present invention, in the signal processing method of the 1st aspect, the decoding step is a step of decoding at least part of coded audio data included in the readout multiplexed data, to generate decoded audio data; the re-coding step is a step of re-coding the decoded audio data by a third coding method which is different from the first coding method, to generate re-coded audio data; and the recording step is a step of recording at least part of the coded video data included in the readout multiplexed data and the re-coded audio data on the second recording medium. Therefore, coded video data and coded audio data included in an MPEG stream or the like which is recorded on the first recording medium can be digitally dubbed, with changing only the coding method of the coded audio data into the optimum coding method for the second recording medium.

According to a 6th aspect of the present invention, in the signal processing method of the 1st aspect, the decoding step is a step of decoding at least part of the coded audio data and at least part of the coded video data which are included in the readout multiplexed data, to generate decoded audio data and decoded video data, respectively; the re-coding step is a step of re-coding the decoded audio data by a third coding method which is different from the first coding method, to generate re-coded audio data, as well as re-coding the decoded video data by a fourth coding method which is different from the second coding method, to generate re-coded video data; and the recording step is a step of recording the re-coded audio data and the re-coded video data on the second recording medium. Therefore, coded video data and coded audio data included in an MPEG stream or the like which is recorded on the first recording medium can be digital dubbed, with changing the respective coding methods of the coded data into the optimum coding methods for the second recording medium.

According to a 7th aspect of the present invention, in the signal processing method of any of the 3rd, 4th and 6th aspects, the second ceding method is MPEG method, and the fourth coding method is JPEG method. Therefore, coded video data included in an MPEG stream of the like which is recorded on the first recording medium can be digitally dubbed, with changing MPEG method as its coding method into JPEG method as the optimum coding method for the second recording medium.

According to an 8th aspect of the present invention, in the signal processing method of the 1st aspect, the coded video data is one which is obtained by coding a video signal using MPEG method as the second coding method; the decoding step is a step of decoding at least a specific portion of the coded video data included in the readout multiplexed data, which portion corresponds to one field or one frame, to generate decoded video data, as well as decoding a prescribed amount of the coded audio data includes in the readout multiplexed data, sequentially from a portion thereof relating to the specific portion, to generate decoded audio data; and the re-coding step is a step of re-coding at least part of the decoded video data by JPEG method to generate re-coded video data, as well as re-coding the decoded audio data by a third coding method which is different from the first coding method to generate re-coded audio data. Therefore, a portion of coded video data included in an MPEG stream or the like being recorded on the first recording medium, which portion corresponds to one designated screen, can be digitally dubbed together with coded audio data corresponding to plural screens relating to the designated screen, with changing MPEG method as its coding method of the coded video data into JPEG method as the optimum coding method for the second recording medium.

According to a 9th aspect of the present invention, there is provided a signal processing method for reading data from a first recording medium on which multiplexed data obtained by multiplexing coded audio data and coded video data are recorded, and recording the data on a second recording medium, comprising: a reading step of reading the multiplexed data from the first recording medium; a decoding step of decoding at least a specific portion of the coded video data included in the readout multiplexed data, which portion corresponds to one field or one frame, to generate decoded video data, as well as decoding a prescribed amount of coded audio data included in the readout multiplexed data, sequentially from a portion thereof relating to the specific portion, to generate decoded audio data; a re-coding step of re-coding at least part of the decoded video data by JPEG method which is different from MPEG method used in a coding process of the coded video data, to generate re-coded video data, as well as re-coding the decoded audio data by a third coding method which is different from a first coding method used in a coding method of the coded audio data, to generate re-coded audio data; and a recording step of recording the re-coded video data and the re-coded audio data on the second recording medium. Therefore, a portion of coded video data included in an MPEG stream or the like recorded on the first recording medium, which portion corresponds to one designated screen, can be digitally dubbed together with coded audio data corresponding to plural screens relating to the designated screen, with changing MPEG method as the coding method of the coded video data into JPEG method as the optimum coding method for the second recording medium.

According to a 10th aspect of the present invention, there is provided a signal processing method for reading data from a first recording medium on which multiplexed data obtained by multiplexing coded audio data and coded video data are recorded, and recording the data on a second recording medium, comprising: a reading step of reading the multiplexed data from the first recording medium; a decoding step of decoding at least part of the coded video data included in the readout multiplexed data, to generate decoded video data; a conversion step of subjecting the decoded video data to a resolution conversion process for thinning out pixel values or a conversion process for converting a data format, to generate converted video data; a re-coding step of re-coding the converted video data to generate re-coded video data; and a recording step of recording the re-coded video data on the second recording medium. Therefore, when coded video data is to be dubbed, the coded video data which is recorded on the first recording medium can be recorded on the second recording medium, with converting resolution or signal format thereof.

According to an 11th aspect of the present invention, there is provided a signal processing apparatus for reading data from a first recording medium on which multiplexed data obtained by multiplexing coded audio data and coded video data are recorded, and recording the data on a second recording medium, comprising: a reading unit for reading the multiplexed data from the first recording medium; a decoder for decoding at least one of the coded audio data and the coded video data which are included in the readout multiplexed data, and outputting decoded data; a re-encoder for re-coding the decoded data by a coding method which is different from a first coding method used in a coding process of the coded audio data and a second coding method used in a coding process of the coded video data, and outputting re-coded data; and a recording unit for recording the re-coded data on the second recording medium. Therefore, a desired portion of audio data and video data which are multiplexed and recorded as an MPEG stream can be selected and dubbed in accordance with the user's designation.

According to a 12th aspect of the present invention, there is provided a signal processing apparatus for reading data from a first recording medium on which multiplexed data obtained by multiplexing coded audio data and coded video data are recorded, and recording the data on a second recording medium, comprising: a reading unit for reading the multiplexed data from the first recording medium; a video decoder for decoding at least a specific portion of the coded video data included in the readout multiplexed data, which portion corresponds to one field or one frame, and outputting decoded video data; an audio decoder for decoding a prescribed amount of the coded audio data included in the readout multiplexed data, sequentially from a portion thereof relating to the specific portion, and outputting decoded audio data; a video encoder for re-coding at least part of the decoded video data by JPEG method which is different from MPEG method used in a coding process of the coded video data, and outputting re-coded video data; an audio encoder for re-coding the decoded audio data by a third coding method which is different from a first coding method used in a coding process of the coded audio data, to generate re-coded audio data; and a recording unit for recording the re-coded video data and the re-coded audio data on the second recording medium. Therefore, a portion of coded video data included in an MPEG stream or the like which is recorded on the first recording medium, which portion corresponds to one designated screen, can be digitally dubbed together with coded audio data corresponding to plural screens relating to the designated screen, with changing MPEG method as the coding method of the coded video data into JPEG method as the optimum coding method for the second recording medium.

According to a 13th aspect of the present invention, there is provided a signal processing apparatus for reading data from a first recording medium on which multiplexed data obtained by multiplexing coded audio data and coded video data are recorded, and recording the data on a second recording medium, comprising: a reading unit for reading the multiplexed data from the first recording medium; a video decoder for decoding at least part of the coded video data included in the readout multiplexed data, to generate decoded video data; a data converter for subjecting the decoded video data to a resolution conversion process for thinning out pixel values or a conversion process for converting a data format, to generate converted video data; an encoder for re-coding the converted video data to generate re-coded video data; and a recording unit for recording the re-coded video data on the second recording medium. Therefore, when coded video data is to be dubbed, the coded video data recorded on the first recording medium can be recorded on the second recording medium, with converting resolution or signal format thereof.

DETAILED DESCRIPTION OF THE PREFERRED EMBODIMENTS

Embodiment 1

Figure 1:
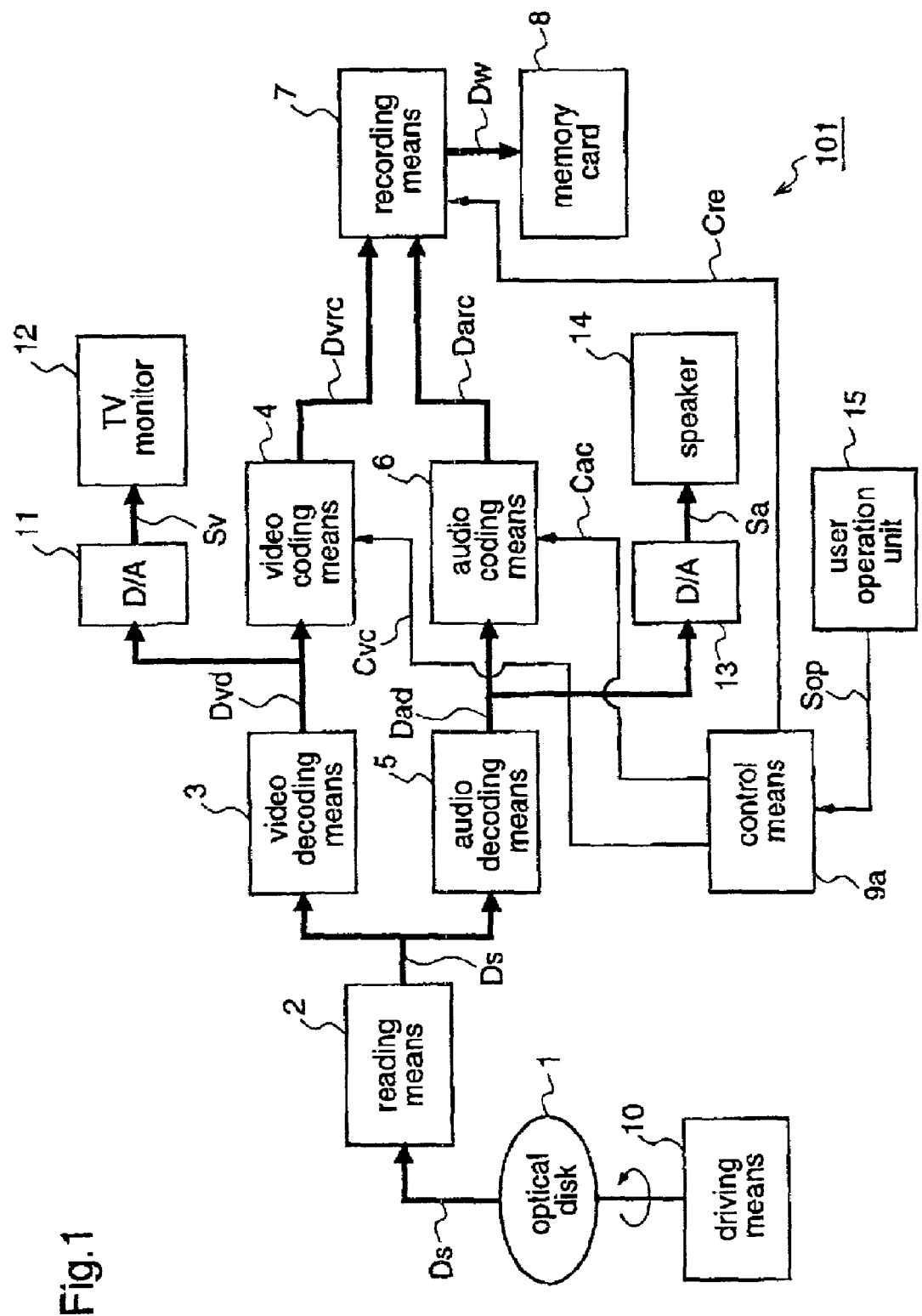
FIG. 1 is a block diagram for explaining a signal processing apparatus according to a first embodiment of the present invention.

FIG. 1 is a block diagram for explaining a signal processing apparatus 101 according to a first embodiment of the present invention.

The signal processing apparatus 101 of this first embodiment is one for processing AV (audio video) data.

More specifically, the signal processing apparatus 101 includes a driving means 10 for driving an optical disk 1 as a first recording medium; and a reading means 2 for reading data Ds from the optical disk 1. On the optical disk 1, an MPEG stream is recorded as the data Ds. As the MPEG stream, there are a transport stream (TS) and a program stream (PS), and in either stream, coded video data and coded audio data are time-axis-compressed and multiplexed so that the both data can be played back in synchronization with each other.

The signal processing apparatus 101 further includes a video decoding means 3 and an audio decoding means 5. The video decoding means 3 receives the data (MPEG stream) DS read from the optical disk 1 by the reading means 2, and decodes the coded video data, which has been obtained by MPEG2 method and is included in the MPEG stream Ds, to output a baseband video signal Dvd. The audio decoding means 5 receives the MPEG stream DS read from the optical disk 1, and decodes the coded audio data, which has been obtained by AC3 method and is included in the MPEG stream Ds, to output a baseband PCM audio signal Dad.

The signal processing apparatus 101 further includes a video coding means 4 and an audio coding means 6. The video coding means 4 receives the baseband video signal Dvd, and encodes a portion of the baseband video signal Dvd, which portion is designated by a control signal Cvc, to output re-coded video data Dvrc. The audio coding means 6 receives the baseband audio signal Dad, and encodes a portion of the baseband audio signal Dad, which portion is designated by a control signal Cac, to output re-coded audio data Darc.

The signal processing apparatus 101 further includes a recording means 7 and a control means 9a. The recording means 7 records the re-coded video data Dvrc outputted from the video coding means 4 and the re-coded audio data Darc outputted from the audio coding means 6, on a memory card 8 as a second recording medium, on the basis of a control signal Cre. The control means 9a generates the control signals Cvc, Cac, Cre and the like for controlling the respective means as mentioned above, on the basis of an operation signal Sop generated by user's operation.

The recording means 7 has a multiplexing unit (not shown) for time-axis-compressing the re-coded video data from the video coding means 4 and the re-coded audio data Darc from the audio coding means 6 and multiplexing these compressed data, and the recording means 7 records the multiplexed re-coded video data and re-coded audio data, as AV multiplexed data Dw, on the memory card 8. It is not required that the recording means 7 should multiplex the re-coded video data and the re-coded audio data, and it may record the re-coded video data and the re-coded audio data in the corresponding areas of the memory card 8, respectively.

Further, the control signal Cvc supplied to the video coding means 4 designates a portion to be re-coded of the baseband video signal Dvd, and the control signal Cac supplied to the audio coding means 6 designates a portion to be re-coded of the baseband audio signal Dad. In FIG. 1, control signals outputted from the control means 9a to the driving means 10, the reading means 2, and the recording means 7 are not shown.

Further, the video coding means 4 encodes a portion of the baseband video signal Dvd, which portion corresponds to one designated frame, by JPEG (Joint Photographic Coding Experts Group) method that is a coding method different from MPEG2. Further, the audio coding means 6 encodes the baseband audio signal Dad, over several frames relating to the video corresponding to the designated frame, by AAC (Advanced Audio Coding) method that is an audio coding method suited to the memory card 8.

The signal processing apparatus 101 further includes a D/A converter 11 for D/A-converting the baseband video signal Dvd outputted from the video decoding means 3 to output an analog video signal Sv; a TV monitor 12 for performing image display on the basis of the analog video signal Sv; a D/A converter 13 for D/A-converting the baseband audio signal Dad outputted from the audio decoding means 5 to output an analog audio signal Sa; and a speaker 14 for performing audio output on the basis of the analog audio signal Sa.

The reading means 2, the video decoding means 3, the audio decoding means 5, the video coding means 4, the audio coding means 6, the recording means 7, the control means 9a, and the D/A converters 11 and 13, which are constituents of the signal processing apparatus 101 of the first embodiment, may be implemented by hardware or software. In this first embodiment, these constituents are implemented by software.

Next, the operation of the signal processing apparatus 101 will be described.

Figure 2:
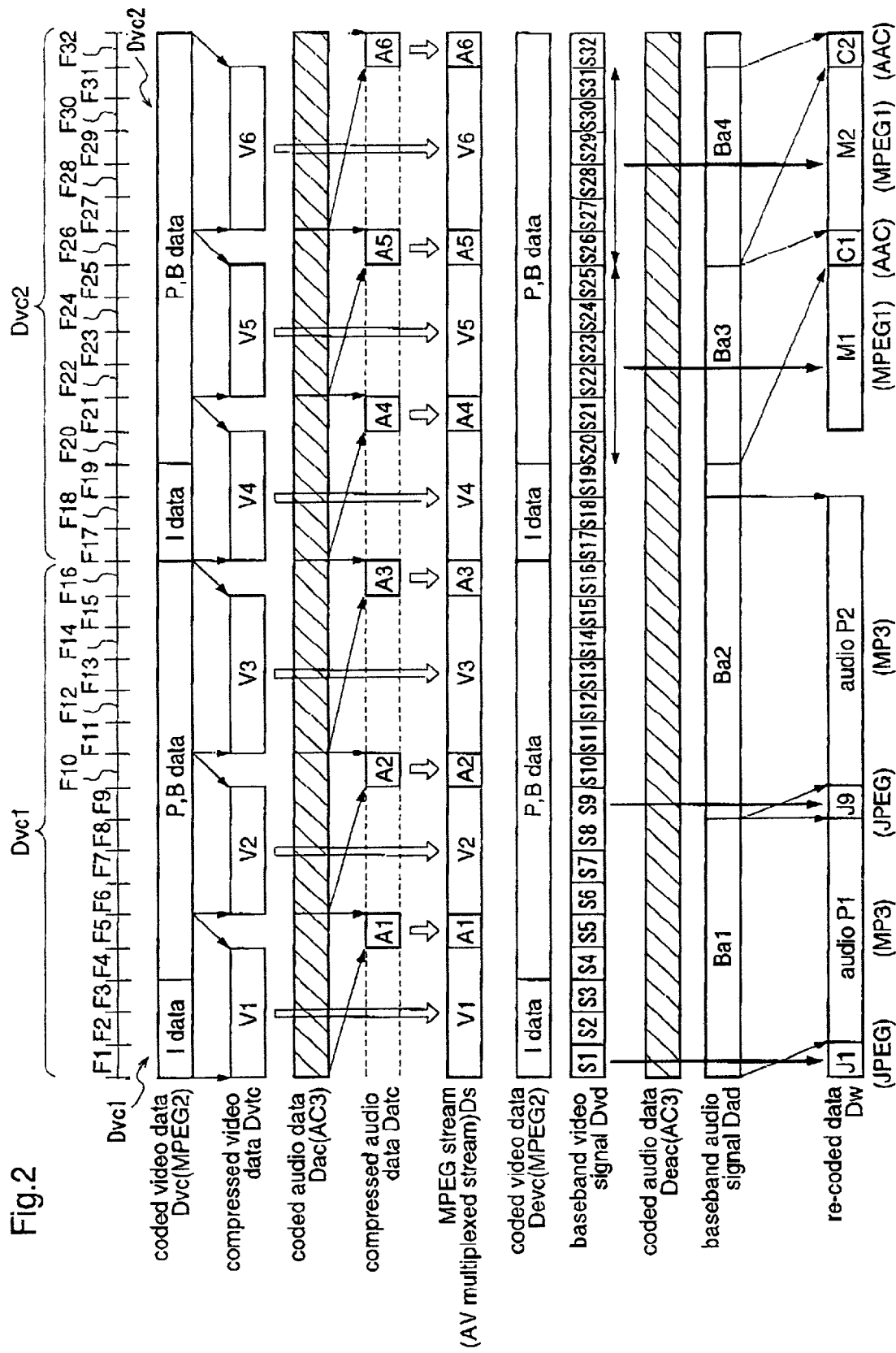
FIG. 2 is a diagram for explaining signal processing by the signal processing apparatus according to the first embodiment.
Figure 6:
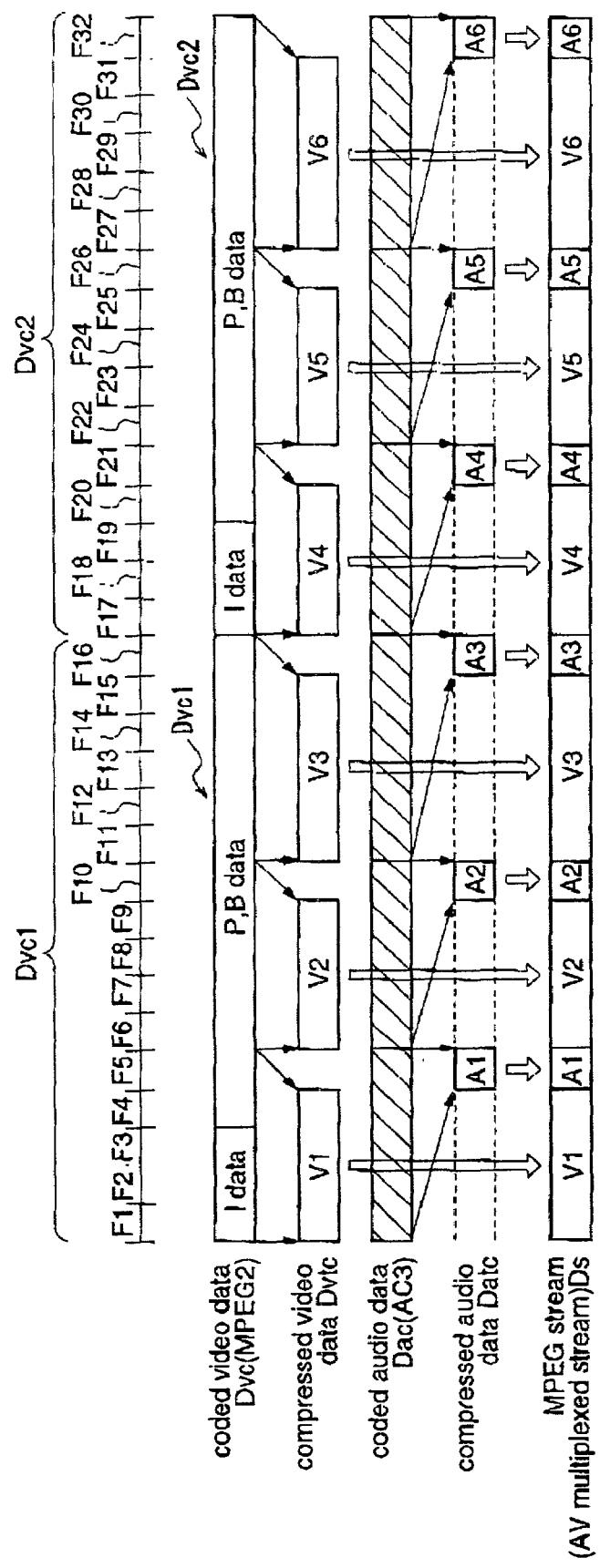
FIG. 6 is a schematic diagram for explaining a data structure of an MPEG stream which is dubbed by a conventional signal processing apparatus.

FIG. 2 is a diagram for explaining the MPEG stream recorded on the optical disk 1 and the multiplexed re-coded data Dw to be recorded on the memory card 8. In FIG. 2, coded video data Dvc, compressed video data Dvtc, coded audio data Dac, compressed audio data Datc, and an MPEG stream Ds are identical to those shown in FIG. 6.

Figure 7:
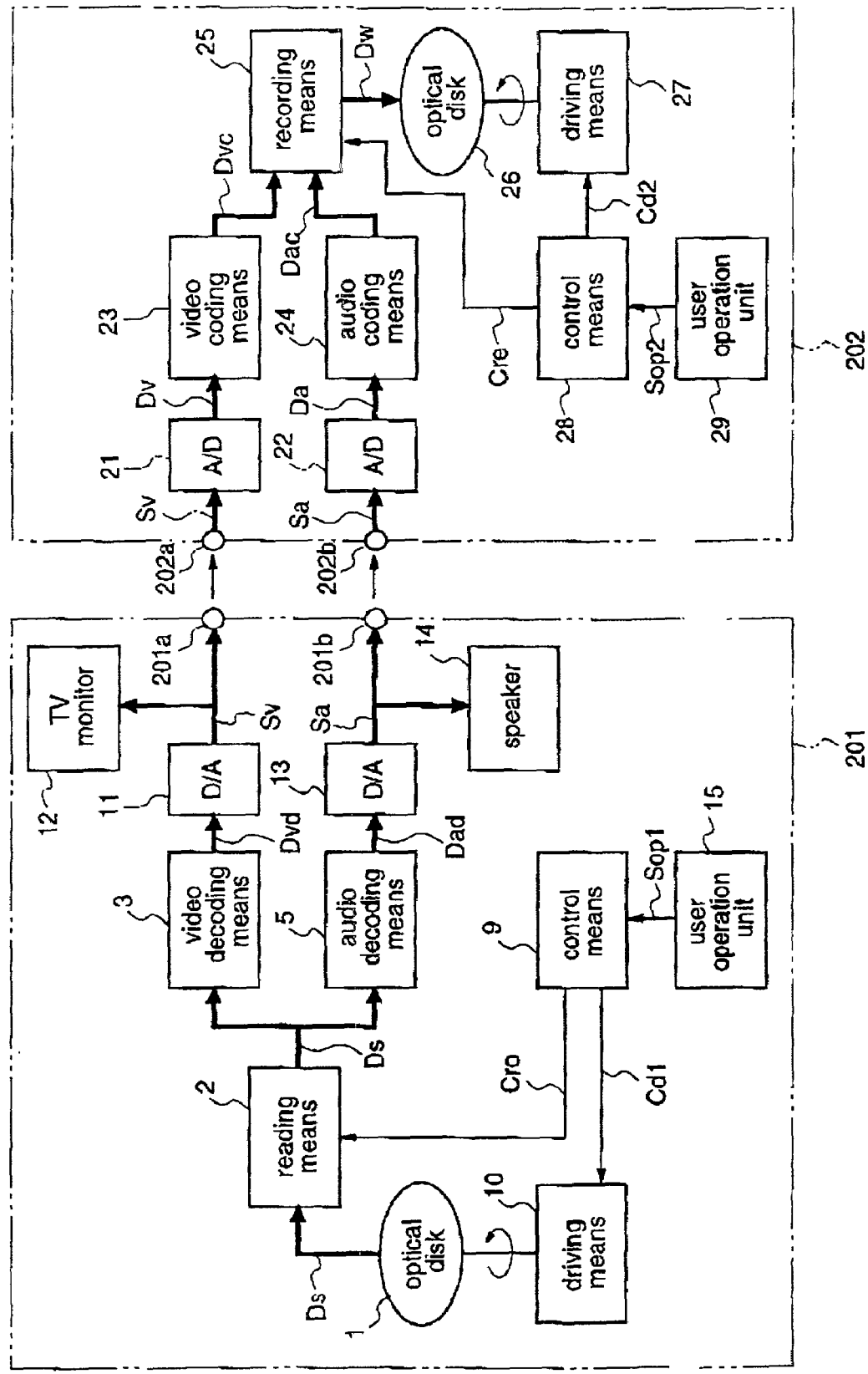
FIG. 7 is a block diagram for explaining a conventional signal processing apparatus.

In the signal processing apparatus 101 of this first embodiment, when an operation signal Sop indicating execution of a process for dubbing the data recorded on the optical disk 1 (the first recording medium) on the memory card 8 (the second recording medium) is outputted from the user operation unit 15 to the control means 9*a* by user's operation, the respective means of the signal processing apparatus 101 perform the dubbing process on the basis of the control signals from the control means 9*a*. In the signal processing apparatus 101 of the first embodiment, as a process for playing back the data recorded on the optical disk 1, a process which is identical to the data playback process performed by the conventional DVD player 201 shown in FIG. 7 is carried out.

That is, initially, the optical disk 1 is driven by the driving means 10, the data Ds is read from the optical disk 1 by the reading means 2, and the read data Ds is supplied to the video decoding means 3 and to the audio decoding means 5.

To be specific, the video decoding means 3 and the audio decoding means 5 are supplied with, as the data Ds, an MPEG stream including MPEG2-coded video data and AC3-coded audio data.

Then, the video decoding means 3 performs a video decoding process for extracting the MPEG2-coded video data Devc from the MPEG stream Ds and decoding the data, whereby a baseband digital video signal Dvd is generated. This digital video signal Dvd is outputted to the D/A converter 11 and the video coding means 4.

In the D/A converter 11, the digital video signal Dvd is converted into an analog video signal Sv by D/A conversion, and the analog video signal Sv is outputted to the TV monitor 12. The TV monitor 12 performs image display on the basis of the analog video signal Sv.

The video coding means 4 performs, on the basis of the control signal Cvc from the control means 9*a*, a re-coding process for coding a portion of the baseband digital video signal Dvd, which portion is designated by the control signal Cvc. For example, as the re-coding process, the video coding means 4 performs a process for coding the digital video signal Dvd corresponding to one frame image, which frame is selected by the user, by JPEG method to generate re-coded video data Dvrc.

The audio decoding means 5 performs an audio decoding process for extracting the AC3-coded audio data Deac from the MPEG stream DS and decoding the data, whereby a baseband PCM digital audio signal Dad is generated. This digital audio signal Dad is outputted to the D/A converter 13 and the audio coding means 6.

In the D/A converter 13, the digital audio signal Dad is converted into an analog audio signal Sa by D/A conversion, and the analog audio signal Sa is outputted to the speaker 14. The speaker 14 performs audio playback on the basis of the analog audio signal Sa.

The audio coding means 6 performs, on the basis of the control signal Cac from the control means 9*a*, a re-coding process for coding a portion of the baseband digital audio signal Dad, which portion is designated by the control signal Cac. For example, the audio coding means 6 performs a process for coding the audio signal Dad, sequentially over several frames from one video frame selected by the user, which frames relate to the image of the selected video frame, by AAC method to generate re-coded audio data Darc. The audio coding means 6 may encode the audio signal Dad by MP3 (MPEG1 audio layer3) method, or by the AAC method.

The re-coded video data Dvrc which is generated by the video coding means 4 and the re-coded audio data Darc which is generated by the audio coding means 6 are supplied to the recording means 7. The re-coded video data Dvrc and the re-coded audio data Darc are multiplexed and recorded on the memory card 8 as the second recording medium by the recording means 7.

Hereinafter, the user's data designation method in the above-mentioned dubbing process and the data recorded on the memory card 8 in accordance with the user's designation are more specifically described.

When an image which the user wants to record (for example, image of the 1st frame F1) is displayed on the TV monitor 12, the user performs a prescribed recording operation. Then, the control means 9*a* generates the control signals Cvc and Cac to the video coding means 4 and the audio coding means 6, on the basis of an operation signal generated by that operation, and supplies the control signals to the respective means.

Then, the video coding means 4 performs a process for coding only a video signal S1 corresponding to the 1st frame F1, which has been inputted as the baseband video signal Dvd, and outputs re-coded video data J1 corresponding to the video signal of one frame to the recording means 7.

Further, at this time, the audio coding means 6 performs a re-coding process for coding an audio signal Ba1 corresponding to video signals of several frames from the frame which has been subjected to the above-mentioned coding process, for example, frames F1 to F8, and outputs re-coded audio data P1 which has been obtained by that re-coding process to the recording means 7.

Then, the recording means 7 correlates the re-coded video data J1 of the image of one frame with the re-coded audio data P1 corresponding thereto so that these data are played back in synchronization with each other, and records these data on the memory card 8.

When the image of the 9th frame F9 is displayed and then the user performs a prescribed recording operation, a video signal S9 of the baseband video signal Dvd, corresponding to the 9th frame, is coded, and for example an audio signal Ba2 corresponding to the 9th to 18th frames is coded as the baseband audio signal Dad relating to the 9th frame, as shown in FIG. 2. Then, re-coded video data J9 of the 9th frame and re-coded audio data P2 of the 9th to 18th frames are outputted to the recording means 7.

In this first embodiment, even when the above-mentioned recording operation is performed, the TV monitor 12 and the speaker 14 perform playback of video and audio corresponding to respective frames successively.

As described above, the signal processing apparatus 101 of the first embodiment includes the reading means 2 for reading an MPEG stream Ds recorded on the optical disk 1 (first recording medium); the video decoding means 3 for decoding MPEG2-coded video data included in the read MPEG stream Ds; and the audio decoding means 5 for decoding AAC-coded audio data included in the read MPEG stream, and re-codes decoded video data corresponding to the image of a frame designated by user's operation and decoded audio data corresponding thereto, by JPEG method and AAC (or MP3) method, respectively, to record the coded data on the memory card 8 as the second recording medium. Therefore, coded video data and coded audio data of a specific portion of the MPEG stream Ds which is recorded on the optical disk 1 can be dubbed with changing their coding methods. Consequently, while watching a still picture of one designated frame, the user can listen to sound relating to that picture over several frames, by playing back coded video data and coded audio data which are recorded on the memory card 8.

In this first embodiment, the descriptions have been given of the case where coded video data of one frame designated by the user (for example, data which is obtained by re-coding decoded video data by JPEG method) and coded audio data over several frames relating to the video data are recorded. However, the coded audio data which is recorded together with the coded video data of one frame is not restricted to the coded audio data over several frames relating to the coded video data of one frame.

For example, coded audio data over several minutes can be recorded as the coded audio data relating to the coded video data of one frame designated by the user. In addition, coded audio data corresponding to one piece of music having the length of approximately three to five minutes can be recorded entirely as the coded audio data relating to one frame.

Further, in this first embodiment, descriptions have been given of the case where coded video data of one frame designated by the user and coded audio data relating thereto over several frames are recorded. However, when the baseband video signal is an interlaced signal, coded video data of one field designated by the user and coded audio data relating thereto over several fields may be recorded.

In this first embodiment, while the signal processing apparatus records coded video data corresponding to the image of one frame designated by the user (i.e., still picture) and coded audio data relating thereto over several frames, the signal processing apparatus may record coded video data corresponding to images of several frames designated by the user (i.e., moving pictures) and coded audio data relating thereto.

For example, in the signal processing apparatus, as shown in FIG. 2, when the user designates the 20th to 25th frames F20 to F25, the recording means 7 can multiplex coded video data M1 which is obtained by coding video signals S20 to S25 corresponding to these frames by MPEG1 method, and coded audio data C1 which is obtained by coding an audio signal Ba3 corresponding to the frames F20 to F25 by AAC method, and record multiplexed data on the memory card 8. In this signal processing apparatus, when the user designates the 26th to 31st frames F26 to F31, the recording means 7 multiplexes coded video data M2 which is obtained by coding video signals S26 to S31 corresponding to these frames by MPEG1 method, and coded audio data C2 which is obtained by coding an audio signal Ba4 corresponding to the frames F26 to F31 by AAC method, and records multiplexed data on the memory card 8.

Further, in this first embodiment, the signal processing apparatus is provided with the D/A converter 11 for D/A-converting a baseband video signal to output an analog video signal; the TV monitor 12 for receiving the analog video signal as an input signal; the D/A converter 13 for D/A-converting a baseband audio signal to output an analog audio signal; and the speaker 14 for receiving the analog audio signal as an input signal, to monitor decoded video and audio signals. However, it is unnecessary to monitor both of the decoded video signal and audio signal.

For example, the signal processing apparatus may be provided with only the D/A converter 11 and the TV monitor 12, among the D/A converters 11 and 13, the TV monitor 12 and the speaker 14, thereby monitoring only the decoded video signal.

Further, in this first embodiment, when an MPEG stream recorded on the first recording medium is to be dubbed, the signal processing apparatus re-codes and records both of coded video data and coded audio data included in the MPEG stream. However, as the dubbing process to the MPEG stream, the signal processing apparatus may perform a process for re-coding one of the coded video data and the coded audio data and recording the other of these data as it is without being re-coded.

In the signal processing apparatus of this first embodiment, when the coded video data J1 corresponding to frame F1 and the coded audio data P1 corresponding to frames F1 to F8 are to be recorded, the TV monitor 12 sequentially displays images of the respective frames subsequent to frame F1. However, in this signal processing apparatus, the TV monitor 12 may keep the display of the image corresponding to frame F1 designated by the user for a prescribed period (for example for 5 seconds) on the basis of the control signal from the control means 9*a*, and thereafter sequentially display images of respective frames subsequent to frame F2.

Further, in this first embodiment, the process for recording the coded video data J1 of frame F1 and the coded audio data Bal of frames F1 to F8 is carried out in real time while the user is watching the image display on the TV monitor 12. However, the process for recording a video signal of a frame designated by the user and an audio signal of several frames corresponding thereto may be carried out by designating a portion desired by the user with using the time of playback or the like, after moving pictures of one image sequence have all been watched.

Embodiment 2

Figure 3:
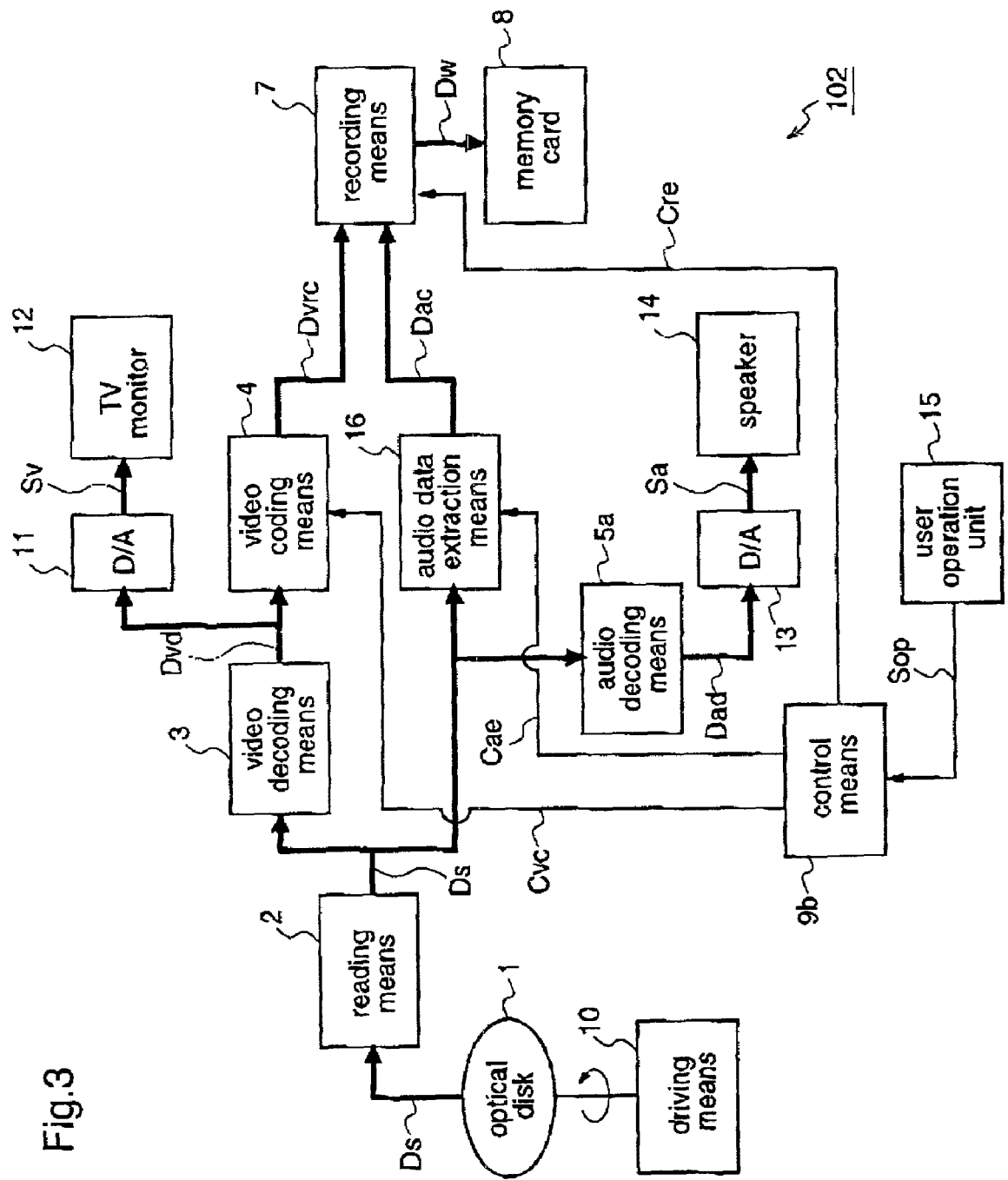
FIG. 3 is a block diagram for explaining a signal processing apparatus according to a second embodiment of the present invention.

FIG. 3 is a block diagram for explaining a signal processing apparatus 102 according to a second embodiment of the present invention.

This signal processing apparatus 102 of the second embodiment includes, in place of the audio decoding means 5 and the audio coding means 6 in the signal processing apparatus 101 of the first embodiment, an audio data extraction means 15 for extracting coded audio data Dac from an MPEG stream Ds read from the optical disk 1 and outputting the coded audio data Dac to the recording means 7; and an audio decoding means 5*a* for receiving the MPEG stream Ds, extracting coded audio data Dac included in the stream, decoding the coded audio data Dac, and outputting decoded audio data Dad to the D/A converter 13. A control means 9*b* in the signal processing apparatus 102 of the second embodiment is different from the control means 9*a* of the first embodiment only in that it outputs a control signal Cae to the audio data extraction means 16, in place of the control signal Cac to the audio coding means 6 in the first embodiment.

Other parts of the signal processing apparatus 102 of the second embodiment are identical to those in the signal processing apparatus 101 of the first embodiment.

Next, the operation of the signal processing apparatus 102 will be described.

When a process for dubbing data recorded on the optical disk 1 (first recording medium) on the memory card 8 (second recording medium) is commanded by user's operation, the signal processing apparatus 102 records coded video data and coded audio data which are designated by the user's operation, on the memory card 8 as the second recording medium.

In the signal processing apparatus 102 of this second embodiment, a process for playing back data recorded on the optical disk 1 is identical to that in the signal processing apparatus 101 of the first embodiment.

Hereinafter, a dubbing process in this second embodiment will be described.

In the signal processing apparatus 102, on the basis of the control signals from the control means 9b, an MPEG stream Ds is read from the optical disk 1, and coded video data and coded audio data which are included in the MPEG stream Ds are decoded by the video decoding means 3 and the audio decoding means 5a, respectively. Then, decoded video data Dvd and decoded audio data Dad are D/A-converted by the D/A converter 11 and 13, respectively, and an analog video signal Sv and an analog audio signal Sa are outputted to the TV monitor 12 and the speaker 14, respectively.

The video coding means 4 performs, on the basis of the control signal Cvc from the control means 9b, a re-coding process for coding a portion of the baseband video signal Dvd, which portion is designated by the control signal Cvc, to output re-coded video data Dvrc which is obtained by that re-coding process, to the recording means 7. The audio data extraction means 16 performs, on the basis of the control signal Cae from the control means 9b, a process for extracting a portion of the MPEG stream Ds, which portion is designated by the control signal Cae, to output extracted coded audio data Dac to the recording means 7.

The re-coded video data Dvrc which has been generated by the video coding means 4 and the coded audio data Dac which has been extracted by the audio data extraction means 15 are recorded by the recording means 7 on the memory card 8 as the second recording medium.

To be more specific, in the signal processing apparatus 102 of this second embodiment, the coded video data recorded on the first recording medium (optical disk) 1 are recorded on the second recording medium (memory card) 8 with changing its coding method from MPEG to JPEG, while the coded audio data recorded on the first recording medium (optical disk) 1 are recorded on the memory card 8 as it is in an AC3-coded state, without changing its coding method.

As described above, the signal processing apparatus 102 of this second embodiment includes the reading means 2 for reading an MPEG stream Ds recorded on the optical disk 1 (first recording medium); the video decoding means 3 for decoding MPEG2-coded video data included in the read MPEG stream; and the audio data extraction means 15 for extracting AC3-coded audio data from the read MPEG stream, and re-codes decoded video data corresponding to the image of a frame designated by user's operation, by JPEG method to record re-coded data on the memory card 8 as the second recording medium, as well as records coded audio data corresponding to the image of the designated frame included in the MPEG stream as it is on the memory card 8. Therefore, when the MPEG stream is to be dubbed, it is possible to record coded video data with changing its coding method, and record coded audio data without carrying out its re-coding process. Consequently, data processing required for re-coding of coded audio data in the dubbing process can be reduced.

In the signal processing apparatus 102 of this second embodiment, when data recorded on the optical disk 1 is dubbed on the memory card 8, coded video data and coded audio data are both recorded on the memory card 8. However, it is possible to record only coded video data on the memory card 8.

Embodiment 3

Figure 4:
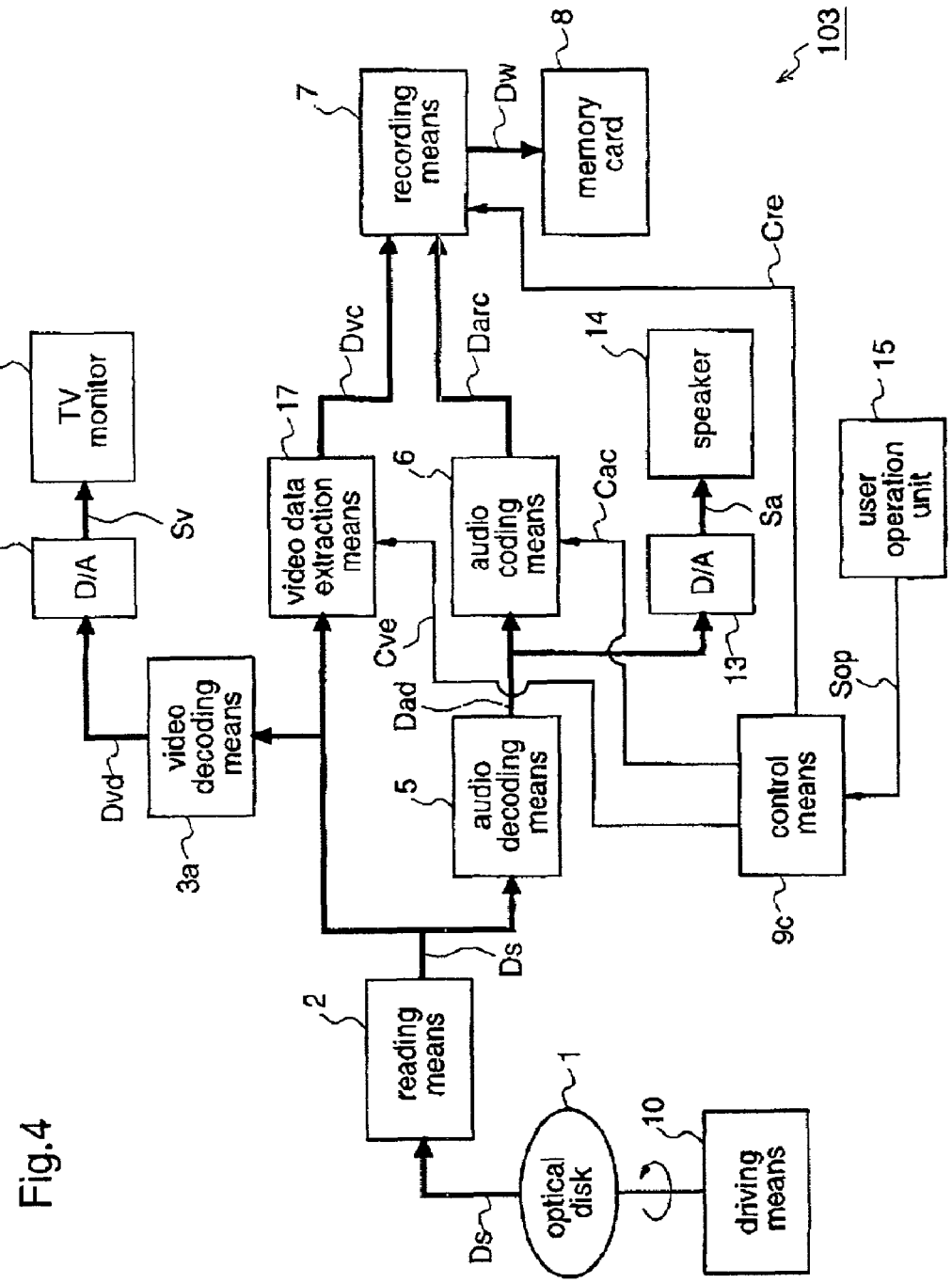
FIG. 4 is a block diagram for explaining a signal processing apparatus according to a third embodiment of the present invention.

FIG. 4 is a block diagram for explaining a signal processing apparatus 103 according to a third embodiment of the present invention.

The signal processing apparatus 103 of this third embodiment includes, in place of the video decoding means 3 and the video coding means 4 in the signal processing apparatus 101 of the first embodiment, a video data extraction means 17 for extracting coded video data Dvc from an MPEG stream Ds read from the optical disk 1, and outputting the data to the recording means 7; and a video decoding means 3a for receiving the MPEG stream Ds, extracting coded video data Dvc included in the stream, decoding the coded video data Dvc, and outputting decoded video data Dvd to the D/A converter 11. Further, a control means 9c in the signal processing apparatus 103 of the third embodiment is different from the control means 9a of the first embodiment only in that it outputs a control signal Cve to the video data extraction means 17, in place of the control signal Cvc to the video coding means 4 of the first embodiment.

Other parts of the signal processing apparatus 103 of the third embodiment are identical to those in the signal processing apparatus 101 of the first embodiment.

Next, the operation of the signal processing apparatus 103 will be described.

When a process for dubbing data recorded on the optical disk 1 (first recording medium) on the memory card 8 (second recording medium) is commanded by user's operation, the signal processing apparatus 103 records coded video data and coded audio data which are designated by the user's operation on the memory card 8 as the second recording medium.

In the signal processing apparatus 103 of this third embodiment, a process for playing back data recorded on the optical disk 1 is identical to that in the signal processing apparatus 101 of the first embodiment.

Hereinafter, a dubbing process in this third embodiment will be described.

In this signal processing apparatus 103, on the basis of the control signals from the control means 9c, an MPEG stream Ds is read from the optical disk 1, and then coded video data and coded audio data which are included in the MPEG stream Ds are decoded by the video decoding means 3a and the audio decoding means 5, respectively. Then, decoded video data Dvd and decoded audio data Dad are D/A-converted by the D/A converters 11 and 13, respectively, and an analog video signal Sv and an analog audio signal Sa are outputted to the TV monitor 12 and the speaker 14, respectively.

At this time, the audio coding means 6 performs, on the basis of the control signal Cac from the control means 9c, a re-coding process for coding a portion of the baseband audio signal Dad, which portion is designated by the control signal Cac, and outputs coded audio data Darc which is obtained by that re-coding process, to the recording means 7. Further, the video data extraction means 17 performs, on the basis of the control signal Cve from the control means 9c, a process for extracting a portion of the MPEG stream Ds, which portion is designated by the control signal Cve, and outputs extracted coded video data Dvc to the recording means 7.

Then, the re-coded audio data Darc which has been generated by the audio coding means 6 and the coded video data Dvc which has been extracted by the video data extraction means 17 are recorded by the recording means 7 on the memory card 8 as the second recording medium.

To be more specific, in the signal processing apparatus 103 of this third embodiment, coded audio data recorded on the first recording medium (optical disk) 1 are recorded on the second recording medium (memory card) 8 with changing its coding method from AC3 to AAC, while coded video data recorded on the first recording medium (optical disk) 1 are recorded on the memory card 8 as it is in a MPEG2-coded state, without changing its coding method. For example, data of moving pictures (plural frames) corresponding to a designated portion of an MPEG stream or data of a still picture (one frame) can be recorded on the memory card 8. When data of one frame is to be recorded on the memory card 8, it is desirable that the frame to be recorded should be an intra-frame coded frame.

As described above, the signal processing apparatus 103 of this third embodiment includes the reading means 2 for reading an MPEG stream Ds recorded on the optical disk 1 as the first recording medium; the audio decoding means 5 for extracting AC3-coded audio data from the read MPEG stream and decoding the extracted data; and the video data extraction means 17 for extracting MPEG2-coded video data from the read MPEG stream, and re-codes decoded audio data corresponding to the image of a frame designated by user's operation, by AAC method to record re-coded data on the memory card 8 as the second recording medium, as well as records coded video data corresponding to the image of a designated frame included in the MPEG stream as it is on the memory card 8. Therefore, when the MPEG stream is to be dubbed, it is possible to record coded audio data with changing its coding method, and record coded video data without performing its re-coding process. Consequently, signal processing required for re-coding of the coded audio data in the dubbing process can be reduced.

In the signal processing apparatus 103 of this third embodiment, when data recorded on the optical disk 1 are to be dubbed on the memory card 8, coded video data and coded audio data are both recorded on the memory card 8. However, it is also possible to record only coded audio data on the memory card 8.

Embodiment 4

Figure 5:
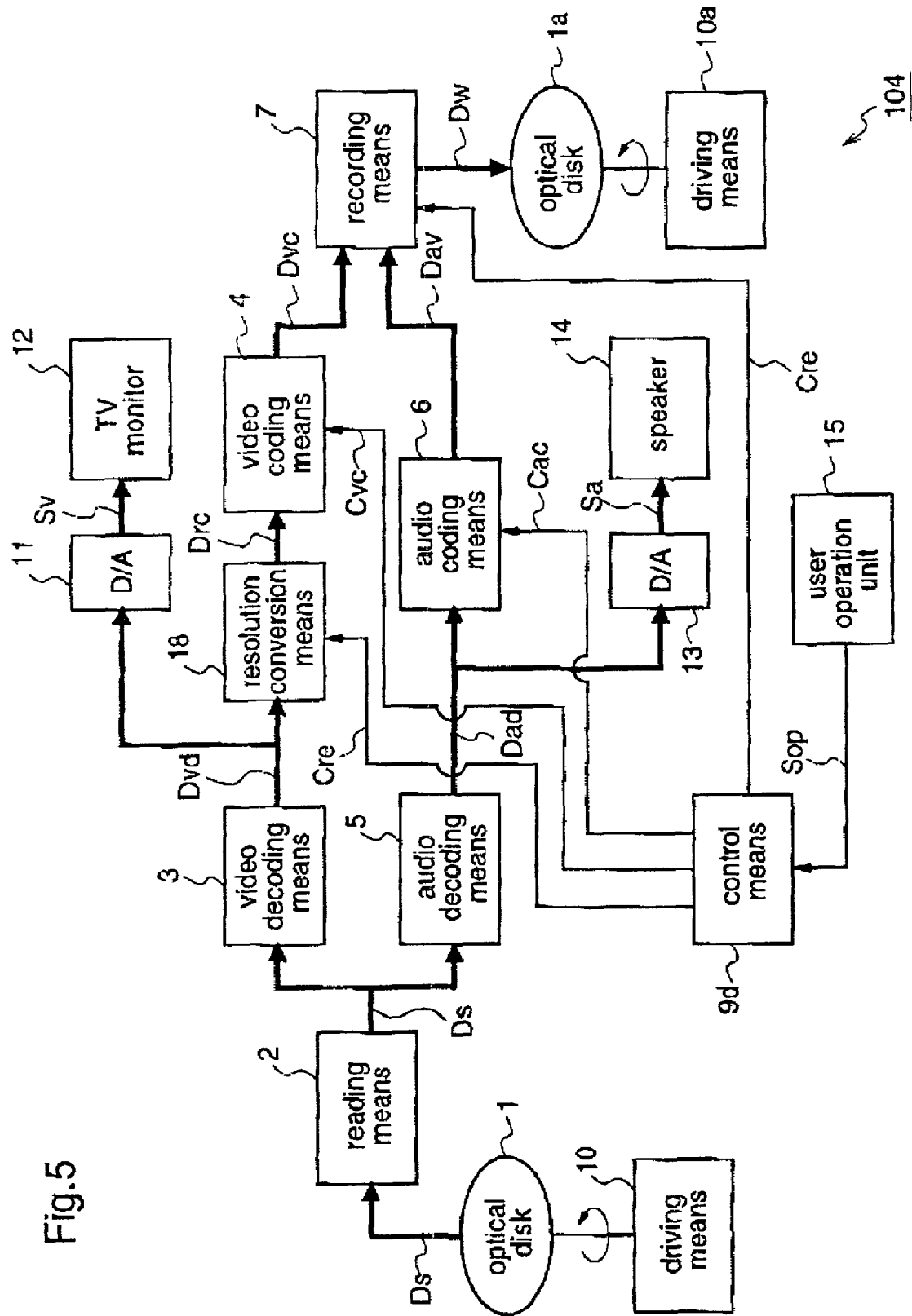
FIG. 5 is a block diagram for explaining a signal processing apparatus according to a fourth embodiment of the present invention.

FIG. 5 is a block diagram for explaining a signal processing apparatus 104 according to a fourth embodiment of the present invention.

The signal processing apparatus 104 of the fourth embodiment includes a resolution conversion means 18 between the video decoding means 3 and the video coding means 4 in the signal processing apparatus 101 of the first embodiment. The resolution conversion means 18 subjects decoded video data Dvd outputted from the video decoding means 3 to resolution conversion, on the basis of a control signal Cre, and outputs video data Drc obtained by the resolution conversion, to the video coding means 4. A control means 9d in this fourth embodiment is different from the control means 9a of the first embodiment only in that it generates the control signal Cre to the resolution conversion means 18.

More specifically, the resolution conversion means 18 subjects decoded video data Dvd outputted from the video decoding means 3 to a process for thinning out pixels constituting one frame, thereby converting the resolution or signal format of the decoded video data Dvd. For example, the resolution conversion means 18 performs a process for thinning out pixel values constituting video data of one frame so that the number of pixels in one frame in the horizontal direction is reduced to one-half, one-third, or two-thirds the original number, or the number of pixels in one frame in the vertical direction is reduced to one-half the original number or the like. This resolution conversion means 18 can perform a process for thinning out pixel values constituting video data of one frame so that the numbers of pixels in one frame in the horizontal direction and vertical direction are reduced at a prescribed ratio, thereby converting a HD (High Definition) signal of HD or the like into a standard signal of SD (Standard Definition) or the like.

The signal processing apparatus 104 of this fourth embodiment further includes, in place of the memory card 8 as the second recording medium in the first embodiment, an optical disk 1a and a driving means 10a for driving the optical disk 1a. The optical disk 1a as a second recording medium can be either a disk different from or the same as the optical disk 1 as the first recording medium.

Other parts in the signal processing apparatus 104 of the fourth embodiment are identical to those in the signal processing apparatus 101 of the first embodiment.

Next, the operation of the signal processing apparatus 104 will be described.

The operation of the signal processing apparatus 104 of the fourth embodiment is different from the operation of the signal processing apparatus 101 of the first embodiment only in that decoded video data Dvd outputted from the video decoding means 3 is subjected to resolution conversion and then resolution-converted data is outputted to the video coding means 4.

To be more specific, when an MPEG stream Ds read from the optical disk 1 is inputted to the video decoding means 3, the video decoding means 3 performs a decoding process for extracting coded video data which has been obtained by MPEG2 method from the MPEG stream, and decoding the extracted coded video data. A baseband video signal Dvd which has been obtained by that decoding process is supplied to the D/A converter 11 and the resolution conversion means 18. The video signal Dvd supplied to the D/A converter 11 is converted into an analog signal and outputted to the TV monitor 12.

On the other hand, the resolution conversion means 18, on the basis of the control signal Cre from the control means 9d, subjects the inputted video signal Dvd to a process for thinning out pixel values of video data corresponding to one frame so that the number of pixels in video of one frame in the horizontal direction or vertical direction is reduced, and outputs resolution-converted video data Drc whose resolution or signal format has been converted, to the video coding means 4.

Then, as in the first embodiment, the video coding means 4 performs, on the basis of the control signal Cvc from the control means 9d, a re-coding process for coding a portion corresponding to a frame in the resolution-converted video data Drc corresponding to the MPEG stream, which frame is designated by the control signal Cvc, by a determined coding method. Here, the coding method in the re-coding process may be either MPEG which is the same as the coding method of coded video data included in the MPEG stream which is recorded on the optical disk 1, or JPEG which is different from that of coded video data included in the MPEG stream.

Further, coded audio data included in the MPEG stream Ds which is read from the optical disk 1 is subjected to a decoding process by the audio decoding means 5 as in the first embodiment. A baseband audio signal Dad which has been obtained by the decoding process is supplied to the D/A converter 13 and the audio coding means 6. The audio signal Dad supplied to the D/A converter 13 is converted into an analog signal, and outputted to the speaker 14. The audio coding means 6 performs, on the basis of the control signal Cac from the control means 9d, a re-coding process for coding a portion corresponding to a frame in the decoded audio data (i.e., baseband audio signal) Dad corresponding to the MPEG stream, which frame is designated by the control signal, by a determined coding method.

When decoded audio data is to be re-coded, it is possible to employ either a coding method which is different from that of coded audio data which is recorded on the first recording medium as described in the first embodiment, or a coding method which is the same as that of coded audio data which is recorded on the first recording medium as described in the second embodiment.

Then, the coded video data Dvc and the coded audio data Dac which have been obtained by the re-coding processes are inputted to the recording means 7, and recorded by the recording means 7 on the optical disk 1a as the second recording medium.

As described above, the signal processing apparatus 104 of this fourth embodiment includes the reading means 2 for reading an MPEG stream DS recorded on the optical disk 1 as the first recording medium; the video decoding means 3 for decoding MPEG2-coded video data included in the read MPEG stream; the audio decoding means 5 for decoding AAC-coded audio data included in the read MPEG stream; and the resolution conversion means 18 for subjecting decoded video data Dvd outputted from the video decoding means 3 to resolution conversion, and re-codes video data Drc which has been obtained by the resolution conversion to record the re-coded data on a recording medium. Therefore, when coded video data is to be dubbed, the coded video data recorded on the first recording medium can be recorded on the second recording medium, with changing the resolution or signal format of the data.

In this fourth embodiment, in the resolution conversion process to video data, only the process for thinning out pixel values constituting image data of one frame (screen) so that the number of pixels in one frame in the horizontal direction or vertical direction is reduced at a prescribed ratio is carried out. However, in the resolution conversion process of video data, it is possible to thin out pixel values corresponding to insignificant pixels in one screen, and select only pixel values corresponding to a partial area of one screen (frame). In this case, only video data corresponding to a designated area in one screen can be re-coded.

In any of the aforementioned embodiments, the MPEG stream is a transport stream (TS), a program stream (PS) and the like, but the MPEG stream is not restricted to these streams.

Further, in any of the aforementioned embodiments, the MPEG coding method of coded video data which is recorded on the first recording medium as an MPEG stream is MPEG2, while the MPEG coding method can be MPEG1, MPEG4, MPEG7 or the like.

In any of the aforementioned embodiments, the coding method of coded audio data which is recorded on the first recording medium as an MPEG stream is AC3, but the coding method of coded audio data is not restricted to AC3 and can be, for example, an audio coding method conforming to MPEG1 or MPEG2, AAC, or PCM.

In any of the aforementioned embodiments, the coding method which is used for re-coding audio data is AAC, but this coding method is not restricted to AAC. For example, the coding method can be an audio coding method conforming to MPEG1 or MPEG2, PCM or the like, as long as it is different from the coding method of coded audio data recorded on the first recording medium (for example AC3).

In any of the aforementioned embodiments, the coding method which is used for re-coding video data is JPEG, but this coding method is not restricted to JPEG. For example, the coding method can be H.261, H.263, Wavelet or the like, as long as it is different from the coding method of coded video data recorded on the first recording medium (for example MPEG2).

Further, in any of the aforementioned embodiments, the first recording medium is an optical disk, but the first recording medium is not restricted to an optical disk and can be a hard disk, a magneto-optical disk, a magnetic disk, a semiconductor memory, or a magnetic tape.

Further, in any of the first to third embodiments, the second recording medium is a memory card 8 as a semiconductor memory, but the second recording medium is not restricted to the memory card and can be, for example, a hard disk, an optical disk, a magneto-optical disk, a magnetic disk, or a magnetic tape.

Further, in any of the aforementioned embodiments, the first recording medium and the second recording medium are separate recording mediums, while these recording mediums can be one recording medium.

Further, in any of the first to fourth embodiments, coded video data and coded audio data which are recorded on the first recording medium are both recorded on the second recording medium, while only one of coded video data and coded audio data can be recorded on the second recording medium.

What is claimed is:

1. A signal processing method for reading data from a first recording medium on which multiplexed data obtained by multiplexing coded audio data and coded video data are recorded, and recording the data on a second recording medium, comprising:
    a reading step of reading the multiplexed data from the first recording medium;
    a decoding step of decoding at least one of: (i) at least part of the coded audio data included in the readout multiplexed data; and (ii) at least part of the coded video data included in the readout multiplexed data, to generate decoded data;
    a designation step of designating a portion of the decoded data as a portion to be re-coded;
    a re-coding step of re-coding the portion of the decoded data designated in the designation step by a coding method which is different from a first coding method used in a coding process of the coded audio data and a second coding method used in a coding process of the coded video data, to generate re-coded data; and
    a recording step of recording the re-coded data on the second recording medium.

2. The signal processing method of claim 1
    wherein the decoding step is a step of decoding at least part of the coded audio data included in the readout multiplexed data, to generate decoded audio data;
    the designation step includes designating a portion of the decoded audio data as the portion to be re-coded; and
    the re-coding step includes re-coding the portion of the decoded audio data designated in the designation step by a third coding method which is different from the first coding method, to generate re-coded audio data as the re-coded data.

3. The signal processing method of claim 1
wherein the decoding step is a step of decoding at least part of the coded video data included in the readout multiplexed data, to generate decoded video data;
the designation step includes designating a portion of the decoded video data as the portion to be re-coded; and
the re-coding step includes re-coding the portion of the decoded video data designated in the designation step by a third coding method which is different from the second coding method, to generate re-coded video data as the re-coded data.

4. The signal processing method of claim 1
wherein the decoding step is a step of decoding at least part of the coded video data included in the readout multiplexed data, to generate decoded video data;
the designation step includes designating a portion of the decoded video data as the portion to be re-coded;
the re-coding step includes re-coding the portion of the decoded video data designated in the designation step by a third coding method which is different from the second coding method, to generate re-coded video data; and
the recording step includes recording at least part of the coded audio data included in the readout multiplexed data and the re-coded video data on the second recording medium.

5. The signal processing method of claim 1
wherein the decoding step is a step of decoding at least part of coded audio data included in the readout multiplexed data, to generate decoded audio data;
the designation step includes designating a portion of the decoded audio data as the portion to be re-coded;
the re-coding step includes re-coding the portion of the decoded audio data designated in the designation step by a third coding method which is different from the first coding method, to generate re-coded audio data; and
the recording step includes recording at least part of the coded video data included in the readout multiplexed data and the re-coded audio data on the second recording medium.

6. The signal processing method of claim 1
wherein the decoding step is a step of decoding at least part of the coded audio data and at least part of the coded video data which are included in the readout multiplexed data, to generate decoded audio data and decoded video data, respectively;
the designation step includes designating portions of the decoded audio data and decoded video data as portions to be re-coded;
the re-coding step includes re-coding the portion of the decoded audio data designated in the designation step by a third coding method which is different from the first coding method, to generate re-coded audio data, as well as re-coding the portion of the decoded video data designated in the designation step by a fourth coding method which is different from the second coding method, to generate re-coded video data; and
the recording step includes recording the re-coded audio data and the re-coded video data on the second recording medium.

7. The signal processing method of claim 3 wherein the second coding method is MPEG method, and the third coding method is JPEG method.

8. The signal processing method of claim 1
wherein the coded video data is coded video data obtained by coding a video signal using MPEG method as the second coding method;
the decoding step includes decoding the coded video data and the coded audio which are included in the readout multiplexed data, to generate decoded video data and decoded audio data;
the designation step includes designating at least a specific portion of the coded video data included in the readout multiplexed data, which portion corresponds to one field or one frame, as a portion to be re-coded, as well as designating a portion of the coded audio data included in the readout multiplexed data, which portion relates to the specific portion, as a portion to be re-coded; and
the re-coding step includes re-coding the portion of the decoded video data designated in the designation step by JPEG method to generate re-coded video data, as well as re-coding the portion of the decoded audio data designated in the designation step by a third coding method which is different from the first coding method to generate re-coded audio data.

9. A signal processing method for reading data from a first recording medium on which multiplexed data obtained by multiplexing coded audio data and coded video data are recorded, and recording the data on a second recording medium, comprising:
a reading step of reading the multiplexed data from the first recording medium;
a decoding step of decoding the coded video data and the coded audio data which are included in the readout multiplexed data to generate decoded video data and decoded audio data;
a designation step of designating at least a specific portion of the coded video data included in the readout multiplexed data, which portion corresponds to one field or one frame, as a portion to be re-coded, as well as designating a portion of the coded audio data included in the readout multiplexed data, which portion relates to the specific portion, as a portion to be re-coded;
a re-coding step of re-coding the portion of the decoded video data designated in the designation step by JPEG method which is different from MPEG method used in a coding process of the coded video data, to generate re-coded video data, as well as re-coding the portion of the decoded audio data designated in the designation step by a third coding method which is different from a first coding method used in a coding method of the coded audio data, to generate re-coded audio data; and
a recording step of recording the re-coded video data and the re-coded audio data on the second recording medium.

10. A signal processing method for reading data from a first recording medium on which multiplexed data obtained by multiplexing coded audio data and coded video data are recorded, and recording the data on a second recording medium, comprising:
a reading step of reading the multiplexed data from the first recording medium;
a decoding step of decoding at least part of the coded video data included in the readout multiplexed data, to generate decoded video data;
a conversion step of subjecting the decoded video data to a resolution conversion process for thinning out pixel values or a conversion process for converting a data format, to generate converted video data;

a designation step of designating a portion of the converted decoded video data as a portion to be re-coded;

a re-coding step of re-coding the portion of the converted decoded video data designated in the designation step to generate re-coded video data; and a recording step of recording the re-coded video data on the second recording medium.

11. A signal processing apparatus for reading data from a first recording medium on which multiplexed data obtained by multiplexing coded audio data and coded video data are recorded, and recording the data on a second recording medium, comprising:

a reading unit for reading the multiplexed data from the first recording medium;

a decoder for decoding at least one of: (i) at least part of the coded audio data included in the readout multiplexed data; and (ii) at least part of the coded video data included in the readout multiplexed data, and outputting decoded data;

a designation step of designating a portion of the decoded data as a portion to be re-coded;

a re-encoder for re-coding the portion of the decoded data designated in the designation step by a coding method which is different from a first coding method used in a coding process of the coded audio data and a second coding method used in a coding process of the coded video data, and outputting re-coded data; and a recording unit for recording the re-coded data on the second recording medium.

12. A signal processing apparatus for reading data from a first recording medium on which multiplexed data obtained by multiplexing coded audio data and coded video data are recorded, and recording the data on a second recording medium, comprising:

a reading unit for reading the multiplexed data from the first recording medium;

a video decoder for decoding the coded video data included in the readout multiplexed data, and outputting decoded video data;

an audio decoder for decoding the coded audio data included in the readout multiplexed data, and outputting decoded audio data;

a designation unit for designating a specific portion of the decoded video data, the specific portion corresponding to at least one field of one frame, as a portion to be re-coded, as well as designating a portion of the decoded audio data, which portion relating to the specific portion, as a portion to be re-coded;

a video encoder for re-coding the portion of the decoded video data designated in by the designation unit by JPEG method which is different from MPEG method used in a coding process of the coded video data, and outputting re-coded video data;

an audio encoder for re-coding the portion of the decoded audio data designated by the designation unit by a third coding method which is different from a first coding method used in a coding process of the coded audio data, to generate re-coded audio data; and a recording unit for recording the re-coded video data and the re-coded audio data on the second recording medium.

13. A signal processing apparatus for reading data from a first recording medium on which multiplexed data obtained by multiplexing coded audio data and coded video data are recorded, and recording the data on a second recording medium, comprising:

a reading unit for reading the multiplexed data from the first recording medium;

a video decoder for decoding at least part of the coded video data included in the readout multiplexed data, to generate decoded video data;

a data converter for subjecting the decoded video data to a resolution conversion process for thinning out pixel values or a conversion process for converting a data format, to generate converted video data;

a designation unit for designating a portion of the decoded video data as a portion to be re-coded;

an encoder for re-coding the portion of the converted video data designated by the designation unit to generate re-coded video data; and a recording unit for recording the re-coded video data on the second recording medium.

14. The signal processing method of claim 4 wherein the second coding method is MPEG method, and the third coding method is JPEG method.

15. The signal processing method of claim 6 wherein the second coding method is MPEG method, and the fourth coding method is JPEG method.

* * * * *